United States Patent [19]

Kitayama et al.

[11] Patent Number: 4,633,046
[45] Date of Patent: Dec. 30, 1986

[54] ADAPTIVE ECHO CANCELLER

[75] Inventors: Seishi Kitayama, Tokyo; Tsutomu Washida, Saitama; Yuzo Fukushi; Yoshinori Ito, both of Tokyo, all of Japan

[73] Assignees: Kokusai Denshin Denwa Co., Ltd., Japan; NEC Corporation, Japan

[21] Appl. No.: 580,922

[22] Filed: Feb. 16, 1984

[30] Foreign Application Priority Data

Feb. 18, 1983 [JP] Japan ................................. 58-24709

[51] Int. Cl.$^4$ ............................................. H04B 3/20
[52] U.S. Cl. ................................. 370/32.1; 364/819; 379/411
[58] Field of Search ................. 179/170.2, 170.6, 170.8

[56] References Cited

U.S. PATENT DOCUMENTS

| 3,787,645 | 1/1974 | Ochiai et al. | 179/170.2 |
| 4,007,341 | 2/1977 | Sourgens et al. | 179/170.2 |
| 4,064,379 | 12/1977 | Horna | 179/170.2 |
| 4,349,889 | 9/1982 | van den Elzen et al. | 364/724 |
| 4,467,146 | 8/1984 | Lassaux | 179/170.2 |
| 4,479,036 | 10/1984 | Yumamato et al. | 179/170.2 |

Primary Examiner—Gene Z. Rubinson
Assistant Examiner—R. Vaas
Attorney, Agent, or Firm—Sughrue, Mion, Zinn, Macpeak and Seas

[57] ABSTRACT

In order to prevent tap coefficient values from drifting toward excessively large values or divergence, an adaptive echo canceller is provided with a correction signal controller which (a) reduces the tap coefficient values upon the polarities of the tap coefficient signal and the tap coefficient correction signal coinciding and (b) increases the tap coefficient values upon the polarities differing.

3 Claims, 3 Drawing Figures

ADAPTIVE ECHO CANCELLER

BACKGROUND OF THE INVENTION

1. Field of the invention

This invention relates to an adaptive echo canceller for cancelling echo signals which inherently occur in long distance 2-wire communications networks, and more specifically to such a canceller which prevents tap coefficients of a transversal filter from drifting toward excessively large values or from divergence.

2. Description of the Prior Art 2-wire communications networks have been constantly plagued by "echo". A known approach to solving this problem is the use of echo suppressors. An echo suppressor opens a send-path to block echo when it detects signal on a receive-path. However, the decision to open is overruled if the return signal from a 4-wire to 2-wire hybrid circuit is deduced to contain near-end party's signal irrespective of the presence of echo to permit the near-end party's signal to be transmitted to the far end. The echo suppressor is thus inherently incapable of blocking echo when both parties are trying to talk simultaneously, i.e., during so-called double talk. Another problem encountered with this type of arrangement is that it imparts a chopping to speech by the opening and closing of the transmission path. Both of these shortcomings have been found more annoying particularly with the echo encountered with satellite circuits.

In order to overcome these problems, adaptive echo cancellers have been proposed. An adaptive echo canceller actually estimates the echo and then subtracts it out of the received signal, and hence is capable of much better performance due to the absence of the opening and closing of the transmission line.

An adaptive echo canceller includes an echo estimator in the form of a transversal filter. The characteristics of the echo estimator are determined using incoming signals. The stable operations of the adaptive echo canceller requires that the incoming signals have a frequency bandwidth or spectrum equal to or wider than that of the actual echo path. More specifically, the echo cancellation is limited to the frequency bandwidth of the incoming signals. No problem therefore exists where the incoming signals are signals having a wide frequency band such as voice signals or white noises in that the incoming signal is capable of covering the actual echo path in terms of frequency bandwidth.

However, there are some cases where signals having relatively a narrow frequency band, such as test tone signals or MODEM (Modulator-Demodulator) signals, are successively applied to an adaptive echo canceller. In such a case, the adaptive echo canceller fails to estimate echo with respect to the frequency spectrum not involved in the incoming signals. When the estimation is disturbed by external noises entering the echo signals, arithmetic errors are generated. These errors do not adversely affect the estimation process of the echo signals if the frequency spectrum of the incoming signals is equal to or extends over the frequency spectrum of the actual echo path.

However, in the case where the incoming signals have a narrow frequency bandwidth, it is no longer expected to exactly estimate a transfer function for identifying the characteristics of the echo estimator. If such identification continues for a long period, arithmetic errors are accumulated to result in the possibility of the dynamic range of a tap coefficient memory being exceeded. Under these divergence conditions, it is impossible to cancel the echo signal.

In order to overcome these problems, Donald L. Duttweiler disclosed in U.S. Pat. No. 4,243,959 an echo canceller entiled "Adaptive Filter With Tap Coefficient Leakage". However, the adaptive filter in this prior art patent complex requires a circuit arrangement.

SUMMARY OF THE INVENTION

The object of this invention is therefore to provide an adaptive echo canceller which is simple in a circuit arrangement and is capable of effectively cancelling echo signals irrespective of the frequency bandwidth of the incoming signals.

Briefly, this object is fulfilled by an arrangement wherein, in order to prevent tap coefficient values from diverging, viz., drifting toward excessively large values, an adaptive echo canceller is provided with a correction signal controller which (a) reduces the tap coefficient values when the polarities of the tap coefficient signal and the tap coefficient correction signal coincide and (b) increases the tap coefficient values when the polarities differ.

More specifically, the present invention takes a form of an adaptive echo canceller for cancelling echo signals in communication paths, comprising: an echo estimator for adaptively producing estimated echo signals using incoming signals, the estimated echo path being a type of transversal filter including a tap coefficient memory; a subtracter adapted to subtract the estimated echo signals from echo signals; a tap coefficient correction signal generator for producing tap coefficient correction signals according to the output of the subtracter and the incoming signals; a tap coefficient updating adder for receiving the output of the tap coefficient correction signal generator and a corresponding tap coefficient signal stored in the tap coefficient memory for updating the tap coefficient signal; and a tap coefficient signal controller for controlling the output of the tap coefficient correction signal generator according to the outputs of the tap coefficient correction signal generator and the tap coeffcent memory.

BRIEF DESCRIPTION OF THE DRAWINGS

The features and advantages of the present invention will become more clearly appreciated from the following description taken in conjunction with the accompanying drawings in which like blocks or circuits are denoted by like reference numerals and in which.

DETAILED DESCRIPTION OF THE PREFERRED EMBODIMENTS

Figure 1:
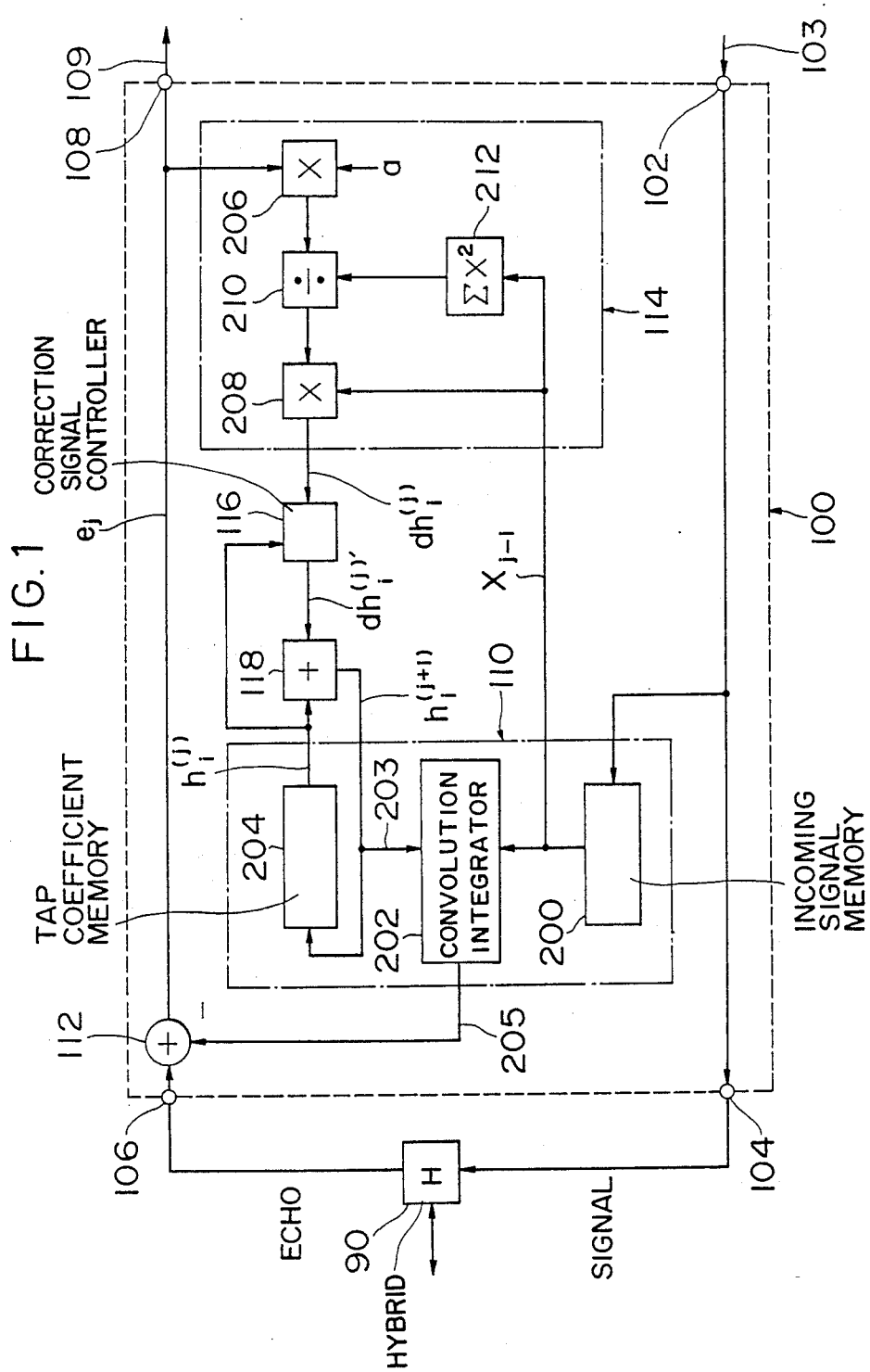
FIG. 1 is a block diagram showing an adaptive echo canceller to which the present invention is applied.

Referring now to FIG. 1, there is shown in block diagram form an adaptive echo canceller 100 to which an improvement has been made in accordance with the present invention. The adaptive echo canceller 100 generally comprises an input terminal 102 to which incoming signals are applied over a first transmission line 103, an output terminal 104 coupled to one terminal of a 4-wire to 2-wire hybrid circuit 90, an input terminal 106 coupled to the other terminal of the hybrid circuit 90, an output terminal 108 coupled to a second transmission line 109, a digital transversal filter 110, a subtracter 112, a correction signal generator (or arithmetic circuit) 114, a correction signal controller 116, and an adder 118, all of which are connected as shown.

The digital transversal filter 110 includes a register 200 for storing the incoming signals, a convolution integrator 202 and a tap coefficient memory 204. The correction signal generator 114 includes two multipliers 206 and 208, a divider 210 and a square-and-add circuit 212.

The incoming signals are applied, via the input terminal 102, to the register 200 and to the hybrid circuit 90 through the output terminal 104. The convolution integrator 202 receives the output of the register 200 and also updated tap coefficient signals over a line 203, and thence produces an estimated echo signal on a line 205. The subtracter 112 is supplied with communication signals along with echo from the hybrid circuit 90, and also receives the estimated echo signals from the transversal filter 110, and thence subtracts out the echo. The output signal $e_j$ of the subtracter 112 is fed to the output terminal 108 and also to the multiplier 206 of the correction signal generator 114. The correction signal generator 114 receives the signal $e_j$ and performs an arithmetic operation according to the following equation (1), and thence produces a tap coefficient correction signal $dh_i(j)$:

$$dh_i(j) = a \frac{e_j X_{j-i}}{\sum_{i=0}^{N} X_{j-i}^2} \quad (1)$$

wherein:
- "a" denotes a predetermined constant value applied to the multiplier 206;
- "i" i-th tap of the transversal filter 110;
- "j" a given time point;
- "N" the number of taps of the transversal filter; and
- $X_{j-i}$ a stored incoming signal from the register 200.

It is easy to understand when referring to FIG. 1 how the arithmetic operation of the equation (1) is implemented by the generator 114 arrangement, so that further detailed description thereof will be omitted for simplicity.

The correction signal controller 116 receives the output $dh_i(j)$ of the generator 114 and an i-th tap coefficient signal $h_i(j)$ from the memory 204, and thence applies a controlled correction signal $dh_i(j)'$ to the adder 118. The adder 118 is supplied with the signal $dh_i(j)'$ as well as the i-th tap coefficient signal $h_i(j)$, sums same and applies a corrected or updated tap coefficient signal $h_i(j+1)$ to the convolution integrator 110. The operation of the adder 118 is represented by the following equation (2):

$$h_i(j+1) = h_i(j) + dh_i(j)' \quad (2)$$

The present invention features the provision of the correction signal controller 116 which prevents the tap coefficient values from drifing towards excessively large values due to accumulation of error signals. The correction signal controller 116 will be discussed in more detail with reference to FIGS. 2 and 3.

Figure 2:
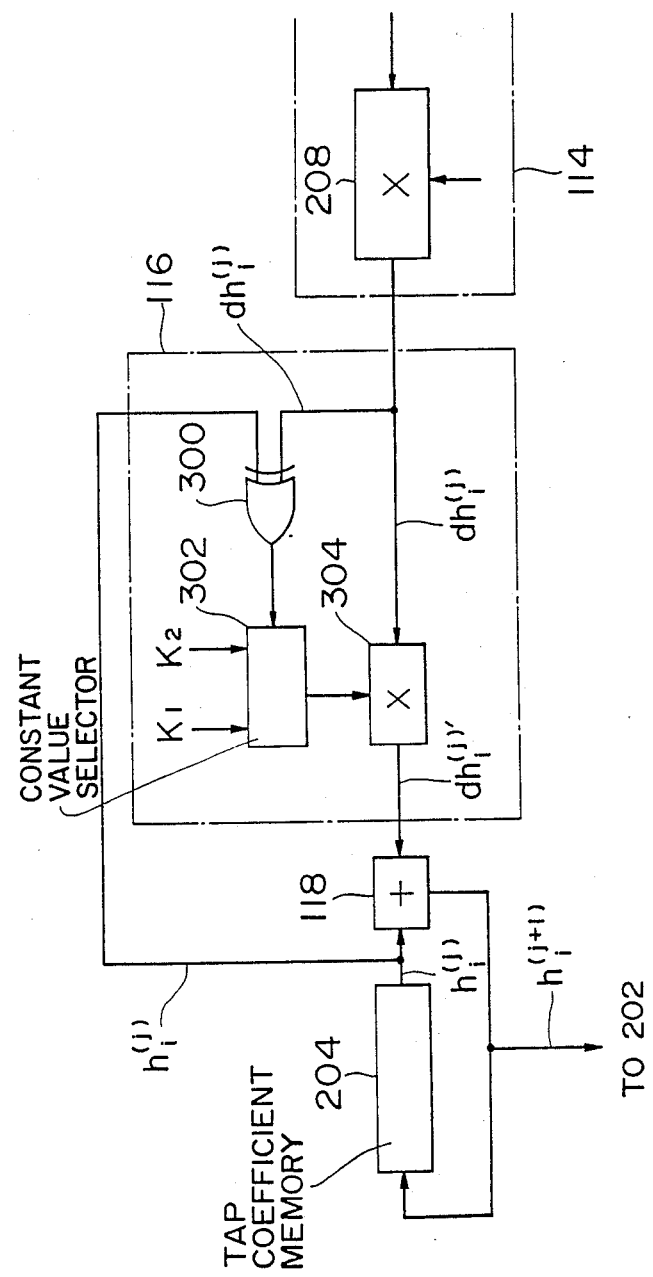
FIG. 2 is a block diagram showing a first embodiment of the present invention.

FIG. 2 is a block diagram showing a first embodiment of the correction signal controller 116 according to the present invention together with some blocks relevant thereto. The controller 116 comprises an exclusive OR gate 300, a constant value selector 302 and a multiplier 304.

In operation, the exclusive OR gate 300 is supplied with the i-th tap coefficient correction signal $dh_i(j)$ and the i-th tap coefficient signal $h_i(j)$, and produces a logic 0 (for example) if the polarities of the two received signals are identical and otherwise produces a logic 1. The selector 302 is responsive to the output of the exclusive OR gate 300 selecting one constant value K1 when receiving logic 0 and the other constant value K2 when receiving logic 1 (K1<K2). The selected constant value K1 or K2 is applied to the multiplier 304, which is arranged to multiply the received value (K1 or K2) with the tap coefficient correction signal $dh_i(j)$ from the generator 114 and thence applies the resultant tap coefficient signal $dh_i(j)'$ to the adder 118.

It is understood from the above that if the two signals $dh_i(j)$ and $h_i(j)$ are of identical polarities, then the signal $dh_i(j)$ is applied to the adder 18 in the form of the controlled signal $dh_i(j)'$ after being reduced in value at the multiplier 304. On the contrary, in the case where the two signals $dh_i(j)$ and $h_i(j)$ are of opposite polarities, the signal $dh_i(j)$ is supplied as the controlled signal $dh_i(j)$ after being increased in its value. Thus, even if incoming signals with relatively narrow frequency band spectra are successively applied to the echo canceller according to the present invention, the transversal filter does not encounter the problem that the tap coefficients are undesirably driven to excessively large values.

Figure 3:
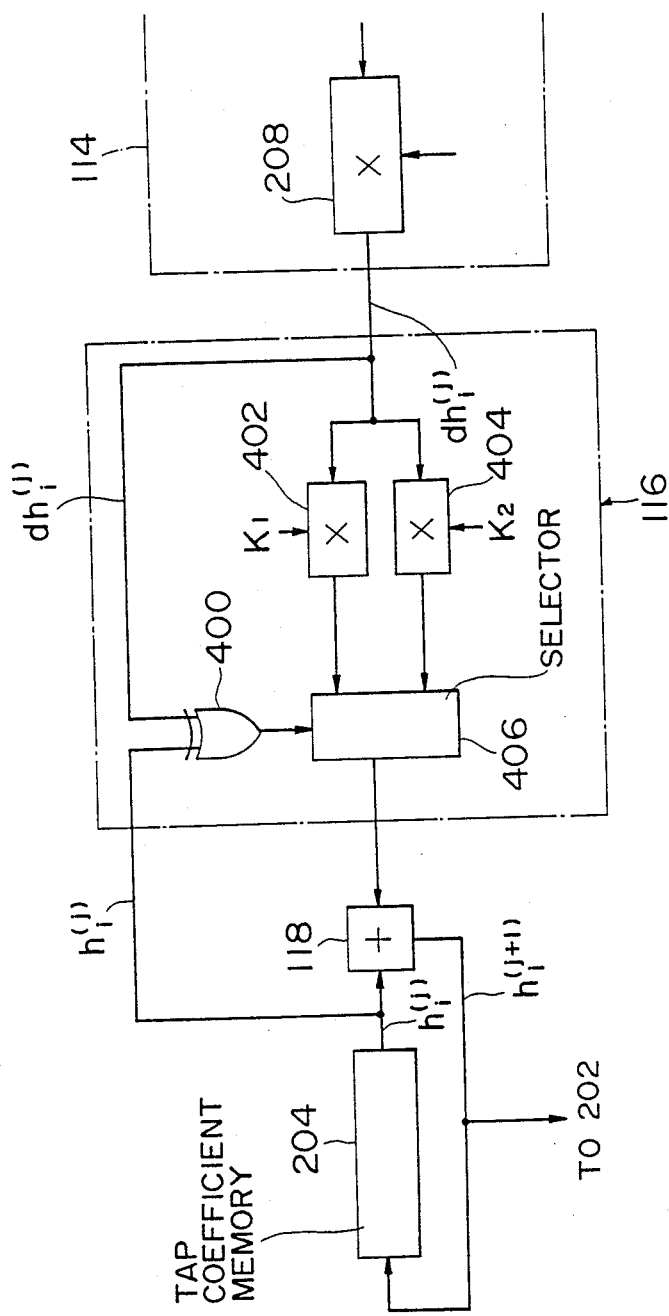
FIG. 3 is a block diagram showing a second embodiment of the present invention.

Turning now to FIG. 3, there is shown in block diagram form a second embodiment of the correction signal controller 116 together with some blocks relevant thereto. The controller 116 comprises an exclusive OR gate 400, two multipliers 402 and 404, and a selector 406.

The exclusive OR gate 400 is supplied with the i-th tap coefficient correction signal $dh_i(j)$ and the i-th tap coefficient signal $h_i(j)$, and produces a logic 0 (for example) if the polarities of the two received signals are identical and otherwise produces a logic 1. While, the correction signal $dh_i(j)$ is applied to both multipliers 402 and 404, which respectively multiply the signal $dh_i(j)$ with the constant values K1 and K2 (K1<K2) and apply the resultant outputs to the selector 406. The selector 406 responds to the output of the exclusive OR gate 400 selecting the output of the multiplier 402 upon reception of the logic 0 and the other constant value K2 upon reception of the logic 1. Thus, one of the outputs of the multipliers 402 and 404 is selectively applied to the adder 118. In this way, the arrangement of FIG. 3 features the same desired effects as discussed with reference to FIG. 2.

The foregoing description shows only preferred embodiments of the present invention. Various modifications are apparent to those skilled in the art without departing from the scope of the present invention which is only limited by the appended claims.

What is claimed is:
1. An adaptive echo canceller for cancelling echo signals in communication paths, comprising:
   an echo estimator for adaptively producing estimated echo signals using incoming signals, said echo estimator comprising a transversal filter including a tap coefficient memory for storing therein a tap coefficient signal;

a subtracter adapted to subtract said estimated echo signals from echo signals;

a tap coefficient correction signal generator for producing a tap coefficient correction signal as a function of said incoming signals and the output of said subtracter;

a tap coefficient signal controller, coupled to said tap coefficient correction signal generator and to said tap coefficient memory, for generating a controlled tap coefficient correction signal as a function of the tap coefficient correction signal and said tap coefficient signal; and a tap coefficient updating adder, coupled to said tap coefficient signal controller and to said tap coefficient memory, for adding said controlled tap coefficient correction signal and said tap coefficient signal stored in said tap coefficient memory for generating an adjusted tap coefficient signal.

2. An adaptive echo canceller as claimed in claim 1, wherein said tap coefficient signal controller comprises:

a logic gate for producing first and second outputs when the polarities of said tap coefficient correction signal and said tap coefficient signal stored in said tap coefficient memory are the same and different, respectively;

a selector for selecting one of two different constant values as a function of the output of said logic gate;

a multiplier for multiplying the output of said selector with said tap coefficient correction signal, the output of said multiplier being fed to said tap coefficient updating adder as said controlled tap coefficient correction signal.

3. An adaptive echo canceller as claimed in claim 1, wherein said tap coefficient signal controller comprises:

a logic gate for producing first and second outputs when the polarities of the tap coefficient correction signal and the tap coefficient signal are the same and different, respectively;

first and second multipliers for respectively multiplying the tap coefficient correction signal with two different constant values;

a selector for selectively allowing outputs of said two multipliers to be applied to said tap coefficient updating adder, as said controlled tap coefficient correction signal, in response to the output of said logic gate.

* * * * *

UNITED STATES PATENT AND TRADEMARK OFFICE
CERTIFICATE OF CORRECTION

PATENT NO. : 4,633,046

DATED : December 30, 1986

INVENTOR(S) : Yuzo FUKUSHI et al

It is certified that error appears in the above-identified patent and that said Letters Patent is hereby corrected as shown below:

Column 2, line 8, delete "patent complex requires a" and insert --patent requires a complex--;

Signed and Sealed this

Eleventh Day of August, 1987

Attest:

DONALD J. QUIGG

Attesting Officer      Commissioner of Patents and Trademarks